UNITED STATES PATENT OFFICE.

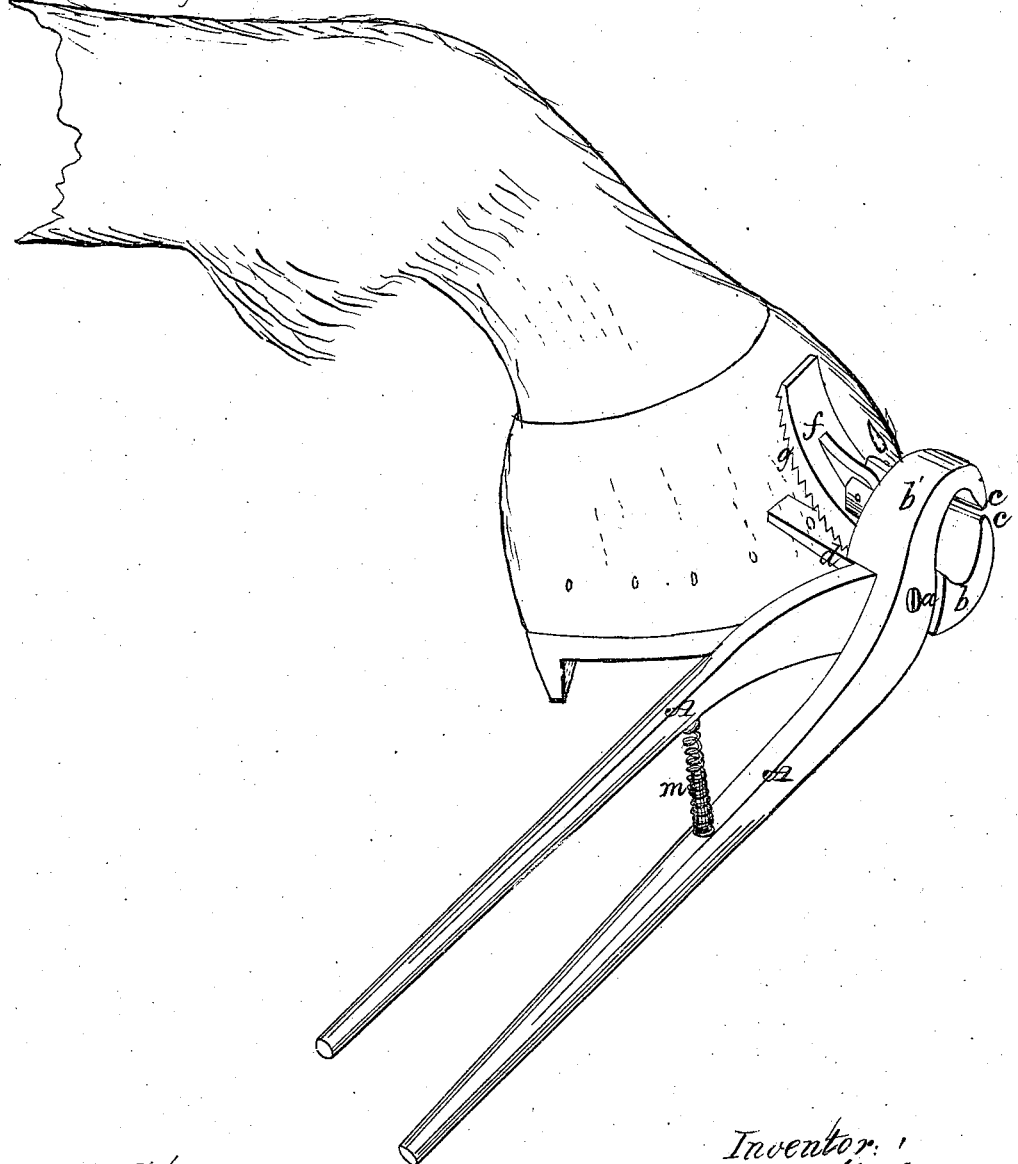

D. A. WILSON, OF CAMBRIDGE, VERMONT, ASSIGNOR TO HIMSELF AND CHAS. P. HIGBEE, OF SAME PLACE.

CLENCHING AND NIPPING TOOL.

Specification forming part of Letters Patent No. 50,539, dated October 17, 1865.

*To all whom it may concern:*

Be it known that I, D. A. WILSON, of Cambridge, in the county of Lamoille and State of Vermont, have invented a new and Improved Clinching and Nipping Tool; and I do hereby declare that the following is a full, clear, and exact description thereof, which will enable others skilled in the art to make and use the same, reference being had to the accompanying drawing, forming part of this specification.

This invention relates to a certain new and useful improvement in a clinching and nipping tool invented and patented by E. Warren, of Marshall, Wisconsin, A. D. 1863; and it consists in a combination of an adjustable clinching tool and nippers so constructed and arranged that the horseshoe-nails may, when a shoe is applied, be clinched on the hoof of the horse without the aid of a hammer, and old nails readily withdrawn from the hoof in detaching a shoe therefrom.

The figure in the accompanying plate of drawings illustrates my improved tool, it being a perspective view, showing it as applied to a horse's hoof.

A A represent the two handles or levers of the implement, which cross each other, and are connected by a rivet, $a$, the short arms or parts $b\ b'$ of which are swaged, forged, or otherwise formed to make cutting-edges $c\ c$, similar to those of ordinary nippers. One of the arms, $b$, has a fixed projection, $d$, extending therefrom at right angles, and the other arm, $b'$, has a projection, $f$, hinged thereto, so as to swing and be adjustable, and extending upward, slightly curved and notched or serrated on its face side, as shown at $g$. The projection $f$ is in line with the projection $d$ and are both on the same side of the tool, being nearly at right angles to each other. The nippers $c\ c$, projections $d\ f$, and arms $b\ b$ should be of steel. The long arms, which form the handles proper, may be of malleable cast-iron.

The tool or implement is used as follows: In drawing nails from the hoof the nippers are applied and used in the usual way, the heads of the nails being grasped by the nippers at the under side of the shoe. In clinching the nails the projection $d$ is placed under the shoe, and the handle or levers distended or forced apart, so that the projection $f$ will act upon the end of the nail that projects through the hoof. The levers are then forced toward each other, and the serrated face of the projection $f$ will draw and clinch the nail, as is evident without further explanation. The face of the projection $d$ can be also serrated or toothed, which would, it is obvious, somewhat prevent the tool from slipping under the shoe.

With the use of my improved tool the shoeing of horses is greatly expedited and the work performed in a satisfactory manner; and, furthermore, by hanging the clinching projection $f$ upon the tool, as described, it can be more perfectly adjusted to the variations in the size and shape of horses' hoofs, the advantages of which are apparent.

$m$ is a spring placed in and between the two levers A A, for the purpose of distending or forcing them apart.

Having thus described my improvement, what I claim as my invention, and desire to secure by Letters Patent, is—

The improvement in a clinching and nipping tool herein described, the same consisting in the use of the adjustable arm or projection $f$, for the purpose specified.

The above specification of my invention signed by me this 27th day of June, 1865.

DANIEL A. WILSON.

Witnesses:
 M. M. LIVINGSTON,
 C. L. TOPLIFF.